(12) United States Patent
Ivey et al.

(10) Patent No.: US 10,479,191 B2
(45) Date of Patent: Nov. 19, 2019

(54) COOLING SYSTEMS AND METHODS FOR AN AGRICULTURAL HARVESTER

(71) Applicant: CNH Industrial America LLC, New Holland, PA (US)

(72) Inventors: Cameron Jackson Ivey, Union Grove, WI (US); Jeffrey D. Thomas, Intercourse, PA (US); Scott Douglas Wilson, Denver, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/847,700

(22) Filed: Dec. 19, 2017

(65) Prior Publication Data

US 2019/0184811 A1    Jun. 20, 2019

(51) Int. Cl.
| | |
|---|---|
| *B60K 11/04* | (2006.01) |
| *B60S 1/62* | (2006.01) |
| *F01P 1/06* | (2006.01) |
| *F01P 11/12* | (2006.01) |
| *A01D 41/12* | (2006.01) |
| *F01P 5/02* | (2006.01) |
| *F01P 3/20* | (2006.01) |
| *A01D 75/00* | (2006.01) |
| *A01D 69/00* | (2006.01) |

(52) U.S. Cl.
CPC .......... *B60K 11/04* (2013.01); *A01D 41/1252* (2013.01); *B60S 1/62* (2013.01); *F01P 1/06* (2013.01); *F01P 11/12* (2013.01); *A01D 69/00* (2013.01); *A01D 75/00* (2013.01); *B60Y 2200/222* (2013.01); *B60Y 2306/05* (2013.01); *F01P 3/20* (2013.01); *F01P 5/02* (2013.01)

(58) Field of Classification Search
CPC .. B60K 11/04; B60K 11/08; F01P 1/06; F01P 11/06; B60S 1/62; A01D 75/187
See application file for complete search history.

(56) References Cited

U.S. PATENT DOCUMENTS

| | | | | |
|---|---|---|---|---|
| 3,824,911 A | * | 7/1974 | Janelid | E21F 1/00 299/12 |
| 4,160,487 A | * | 7/1979 | Kunze | B60K 11/08 123/41.04 |
| 4,233,040 A | * | 11/1980 | Vogelaar | A01D 41/12 55/282.5 |
| 4,886,532 A | | 12/1989 | Zimmerman | |

(Continued)

FOREIGN PATENT DOCUMENTS

| | | |
|---|---|---|
| DE | 102012103276 A1 | 10/2013 |
| EP | 3034830 A1 | 6/2016 |

OTHER PUBLICATIONS

International Search Report and Written Opinion for PCT/US2018/066520 dated Apr. 8, 2019 (12 pages).

*Primary Examiner* — Frank B Vanaman
(74) *Attorney, Agent, or Firm* — Peter K. Zacharias; Patrick M. Sheldrake

(57) ABSTRACT

A cooling system for an agricultural vehicle includes a housing configured to support one or more cooling components, a debris conduit extending from the housing of the cooling system, a suction fan configured to rotate to apply negative airflow, and a valve configured to move between an open position in which the debris conduit is fluidly coupled to the suction fan and a closed position in which the debris conduit is isolated from the suction fan.

20 Claims, 3 Drawing Sheets

(56) References Cited

U.S. PATENT DOCUMENTS

| | | | |
|---|---|---|---|
| 5,901,786 A * | 5/1999 | Patel | B60K 11/04 |
| | | | 123/41.04 |
| 6,029,430 A | 2/2000 | Isfort et al. | |
| 6,126,079 A * | 10/2000 | Shoemaker | F01P 5/043 |
| | | | 123/41.12 |
| 6,321,830 B1 * | 11/2001 | Steinmann | B60K 11/04 |
| | | | 123/41.01 |
| 6,959,671 B2 * | 11/2005 | Nakagawa | E02F 9/0866 |
| | | | 123/41.12 |
| 7,431,073 B2 | 10/2008 | Radke et al. | |
| 7,878,171 B2 | 2/2011 | Vandike et al. | |
| 7,997,238 B2 | 8/2011 | D'hondt et al. | |
| 8,967,092 B1 * | 3/2015 | Jones | F04D 27/00 |
| | | | 123/41.12 |
| 8,997,906 B2 | 4/2015 | Schertz et al. | |
| 9,579,968 B2 | 2/2017 | Rizzon et al. | |
| 9,586,473 B2 | 3/2017 | Pfohl et al. | |
| 2004/0003578 A1 * | 1/2004 | Twiefel | A01D 41/1252 |
| | | | 55/289 |
| 2007/0006827 A1 | 1/2007 | Chaney et al. | |
| 2010/0071870 A1 * | 3/2010 | Kisse | F01P 1/02 |
| | | | 165/51 |
| 2014/0090800 A1 | 4/2014 | Dossner et al. | |
| 2014/0151139 A1 | 6/2014 | Rizzon et al. | |
| 2014/0311140 A1 * | 10/2014 | Hyodo | F01P 7/044 |
| | | | 60/489 |
| 2017/0096931 A1 | 4/2017 | Beichner et al. | |

* cited by examiner

COOLING SYSTEMS AND METHODS FOR AN AGRICULTURAL HARVESTER

BACKGROUND

The disclosure relates generally to agricultural vehicles, and more specifically, to cooling systems and methods for an agricultural harvester.

Generally, a harvester includes a header configured to collect an agricultural product from an agricultural field. Once the agricultural product is collected, a threshing component may separate harvested goods (e.g., grain) from other materials (e.g., chaff, foliage). The harvested goods may be directed to a storage tank of the harvester, while the other materials may be directed through outlets of the harvester to the agricultural field. Unfortunately, during operation of the harvester, debris may accumulate within a housing that supports various cooling components (e.g., heat exchangers) that cool fluid used in an engine or other portions of the harvester.

BRIEF DESCRIPTION

In one embodiment, a cooling system for an agricultural vehicle includes a housing configured to support one or more cooling components, a debris conduit extending from the housing of the cooling system, a suction fan configured to rotate to apply negative airflow, and a valve configured to move between an open position in which the debris conduit is fluidly coupled to the suction fan and a closed position in which the debris conduit is isolated from the suction fan.

In one embodiment, a cooling system for an agricultural vehicle includes a housing configured to support one or more cooling components, a cooling fan positioned proximate to the housing, a debris conduit extending from the housing, a valve configured to move between an open position in which the debris conduit is fluidly coupled to a suction fan and a closed position in which the debris conduit is isolated from the suction fan, and an electronic controller configured to generate control signals to coordinate rotation of the cooling fan and movement of the valve.

In one embodiment, a method of operating a cooling system for an agricultural vehicle includes rotation a cooling fan to draw air from an inlet to an outlet of a housing of the cooling system, reversing rotation of the cooling fan to push air from the outlet to the inlet of the housing, and adjusting a valve from a closed position to an open position to fluidly couple a suction fan to a debris conduit extending from the housing to facilitate removal of debris from the housing.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
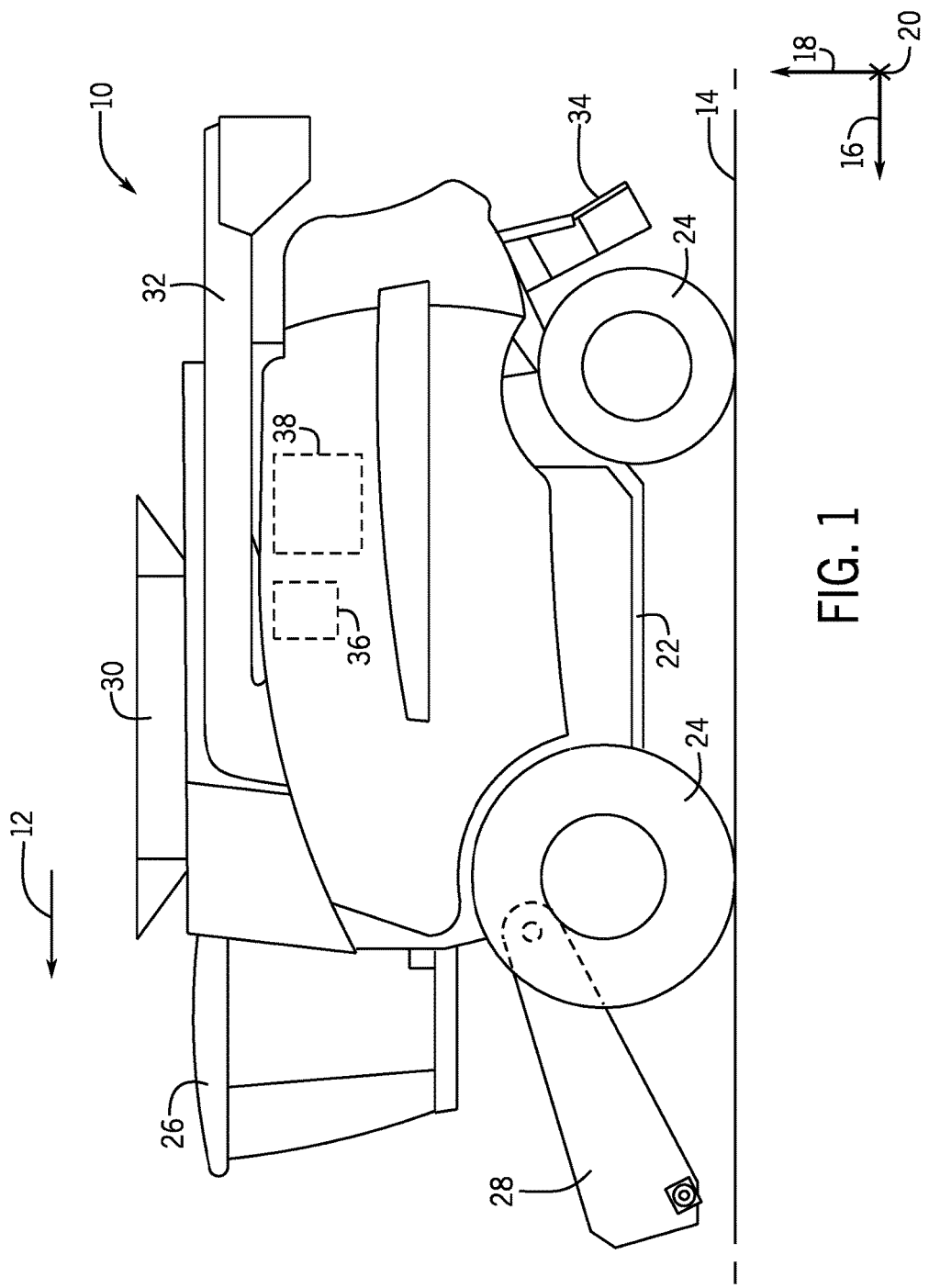
FIG. 1 is a side view of a harvester configured to harvest an agricultural product, in accordance with an embodiment of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

A harvester collects an agricultural product (e.g., crop) from an agricultural field and separates portions of the agricultural product into harvested goods (e.g., grain) and other agricultural materials (e.g., chaff, foliage). In some cases, debris (e.g., chaff, foliage, dust) may accumulate in a housing (e.g., cooler box) that supports one or more cooling components (e.g., heat exchangers) that cool fluid used in an engine or other portions of the harvester. However, the debris may interfere with operation of the one or more cooling components, for example. Accordingly, the disclosed embodiments provide a cooling system that includes components that facilitate removal of debris from the housing. For example, during normal operation of the cooling system, a cooling fan may rotate in a first direction to draw air from an inlet to an outlet of the housing. The air may facilitate cooling via the one or more cooling components and facilitate cooling and/or cleaning a portion of the harvester proximate to the outlet of the housing (e.g., to cool and/or clean the engine). At the same time, a suction fan that is fluidly coupled to a cleaning wand may apply negative pressure at the cleaning wand to facilitate removing debris from a screen at the inlet of the housing.

To remove debris that accumulates within the housing, the presently disclosed cooling system includes a debris conduit that extends from the housing and a valve. The valve may be moved between an open position in which the debris conduit is fluidly coupled to the suction fan and a closed position in which the debris conduit is isolated from the suction fan. During a cleaning operation, the cooling fan may rotate in a second direction to push air from the outlet to the inlet of the housing, which may blow or dislodge debris from the one or more cooling components within the housing. At substantially the same time, the valve may be moved from the closed position to the open position to enable the suction fan to draw debris out of the housing through the debris conduit. In some cases, the valve may isolate the cleaning wand from the suction fan while the valve is in the open position during the cleaning operation. In some cases, the cooling fan may be stopped (e.g., stationary relative to the housing) for a period of time (e.g., a delay period) while the valve is in the open position during the cleaning operation, which may enable the debris to settle at a bottom surface of the housing and facilitate removal of the debris through the debris conduit, for example. As discussed in more detail below, a controller may generate control signals to coordinate operation of the cooling fan, suction fan, and the valve.

Advantageously, the disclosed system may enable effective and efficient cleaning of the housing of the cooling system. While the present disclosure illustrates embodiments of a harvester to facilitate discussion, it should be understood that the cooling system disclosed herein may be used with any of a variety of agricultural vehicles, such as tractors, sprayers, planters, trucks, utility vehicles, or the like.

Turning now to the drawings, FIG. 1 is a side view of an embodiment of a harvester 10 that is configured to move in a forward direction of travel 12 through an agricultural field 14 to harvest an agricultural product (e.g., crop). To facilitate discussion, the harvester 10 and its components may be described with reference to a longitudinal axis or direction 16, a vertical axis or direction 18, and a lateral axis or direction 20.

As shown, the harvester 10 includes a chassis 22 (e.g., frame) supported on wheels 24, an operator cab 26 configured to house an operator, a header 28 configured to collect the agricultural product from the agricultural field 14, a tank 30 (e.g., storage tank or bin) configured to store harvested goods, an auger 32 configured to unload or transfer the harvested goods from the tank 30 (e.g., to a truck or cart), and an outlet 34 configured to deposit agricultural materials (e.g., chaff, foliage) separated from the harvested goods into the agricultural field 14. The harvester 10 also includes an engine 36 and a cooling system 38, which includes various components (e.g., heat exchangers) that cool fluid for the engine 36 or other portions of the harvester 10. During operation of the harvester 10, debris may accumulate on certain components of the cooling system 38. Thus, the presently disclosed cooling system 38 includes various features to facilitate efficient removal of debris from the components of the cooling system 38.

Figure 2:
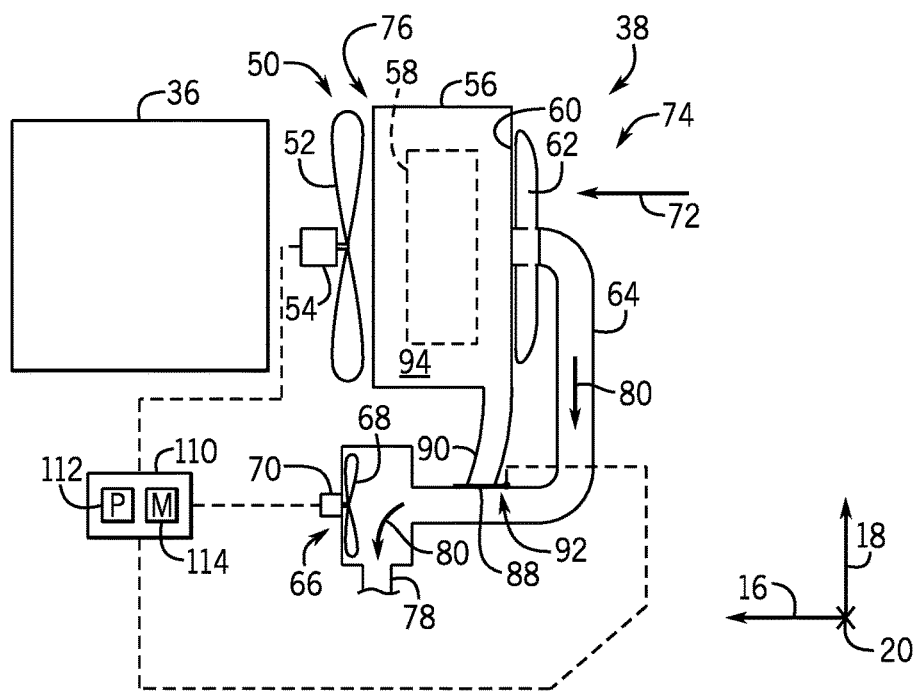
FIG. 2 is a side view of a cooling system that may be used in the harvester of FIG. 1 with a valve in a closed position, in accordance with an embodiment of the present disclosure.

FIG. 2 is a side view of an embodiment of the cooling system 38 that may be used in the harvester 10. In the illustrated embodiment, the cooling system 38 includes a cooling fan 50 having blades 52 and a motor 54 that drives rotation of the blades 52. The cooling system 38 also includes a housing 56 (e.g., cooler box), which may support one or more cooling components 58 (e.g., heat exchangers). For example, the one or more cooling components 58 may include one or more of a radiator that is configured to cool a fluid for the engine 36, a hydraulic cooler that is configured to cool a hydraulic fluid for a hydraulic power circuit, or a condenser that is configured to cool a refrigerant used in an air conditioning circuit. As shown, a screen 60 (e.g., perforated screen) is provided along one side of the housing 56, and a cleaning wand 62 is positioned proximate to the screen 60. Additionally, a suction conduit 64 (e.g., hose) extends from the cleaning wand 62 to a suction fan 66, which includes blades 68 and a motor 70 that drives rotation of the blades 68.

During normal operation of the cooling system 38, the cooling fan 50 rotates to draw air through the housing 56 of the cooling system 38 in the direction of arrow 72. Thus, the air flows through the screen 60 positioned at an inlet 74 of the housing 56, and the air is exhausted from the housing 56 via an outlet 76 of the housing 56 positioned proximate to cooling fan 50 and the engine 36. The screen 60 acts as a filter to block at least some agricultural product (e.g., harvested goods, foliage, chaff), dust, or other particulates from entering the housing 56. However, some debris may become stuck on the screen 60 (e.g., between the screen 60 and the cleaning wand 62). Thus, the cleaning wand 62 rotates relative to the screen 60 to remove the debris from the screen 60, and the suction fan 66 may provide negative airflow (e.g., suction) at the cleaning wand 62 to draw or pull the debris from the screen 60. For example, the cleaning wand 62 may include hollow chambers that are in fluid communication with the suction conduit 64 and the suction fan 66, and the hollow chambers may include openings along a surface of the cleaning wand 62 facing the screen 60 to enable the cleaning wand 62 to draw or pull the debris from the screen 60. The debris removed from the screen 60 may flow through the suction conduit 64 to a debris outlet 78, as shown by arrows 80. In this way, the cooling system 38 cleans the screen 60 to enable sufficient airflow through the housing 56 to facilitate cooling via the one or more cooling components 58 and to facilitate cooling and/or cleaning a portion of the harvester 10 proximate to the outlet 76 of the housing 56 (e.g., to cool and/or clean the engine 36), for example.

During normal operation of the cooling system 38, some debris may pass through the screen 60 and may become trapped within the housing 56. The cooling system 38 includes a valve 88 (e.g., diverter element, flapper valve, hinged door) and a debris duct 90 (e.g., hose) to facilitate removal of debris from the housing 56. In the illustrated embodiment, the valve 88 is in a closed position 92 (e.g., normal or default position) in which the valve 88 blocks a flow of air and debris from a chamber 94 of the housing 56 through the debris duct 90. Thus, while the valve 88 is in the closed position 92, the debris conduit 90 is isolated from the suction fan 66. However, while the valve 88 is in the closed position 92, the cleaning wand 62 is fluidly coupled to the suction fan 66, thereby enabling the negative airflow to draw the debris from the screen 60.

Figure 3:
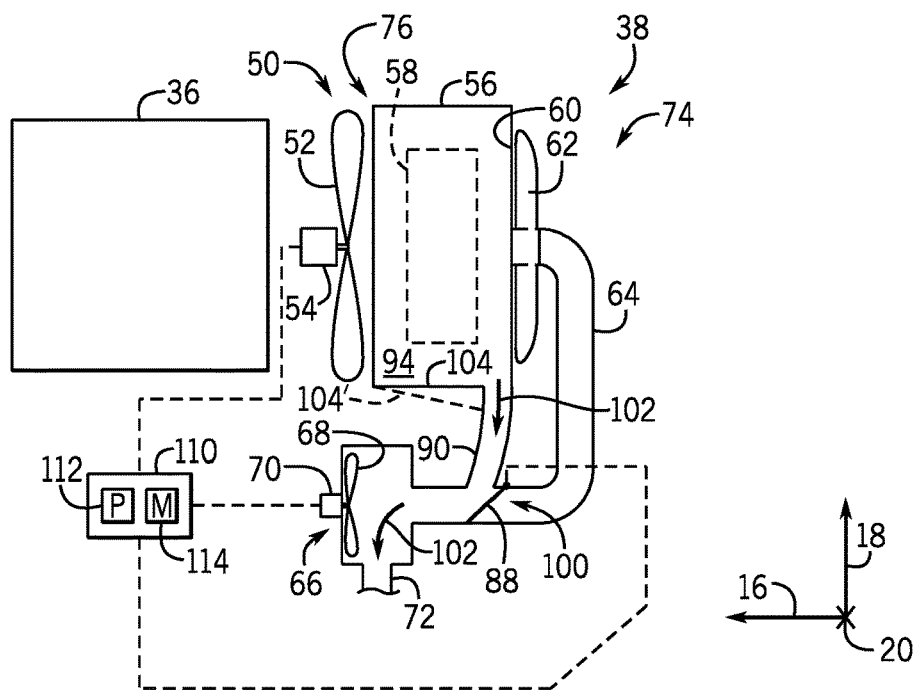
FIG. 3 is a side view of the cooling system of FIG. 2 with the valve in an open position, in accordance with an embodiment of the present disclosure.

With the foregoing in mind, FIG. 3 is a side view of the cooling system 38 with the valve 88 in an open position 100. In the open position 100, the valve 88 enables air and debris to flow from the chamber 94 of the housing 56 to the debris outlet 78. More particularly, while the valve 88 is in the open position 100, the suction fan 66 is fluidly coupled to the debris conduit 90 and the chamber 94 of the housing 56, thereby enabling negative airflow to draw the debris from the chamber 94 of the housing 56, into the debris conduit 90, and out of the debris outlet 72, as shown by arrows 102.

In the illustrated embodiment, when the valve 88 is in the open position 100, the valve 88 also blocks the flow of air and debris through the suction conduit 64 or isolates the cleaning wand 62 from the suction fan 66. However, in some embodiments, when the valve 88 is in the open position 100, the valve 88 may not block the flow of air and debris through the suction conduit 64 or the cleaning wand 62 may remain in fluid communication with the suction fan 66. It should be appreciated that the valve 88 may have any suitable characteristics that enable the valve 88 to move between the closed position 92 and the open position 100. For example, the valve 88 may be a flapper valve having a plate that is rotatably coupled (e.g., via a hinge or pivot) to a wall of the suction conduit 64 or other surface of the cooling system 38.

As shown in FIG. 3, the debris conduit 90 extends from a surface 104 of the housing 56, and the surface 104 is a bottom or lower surface of the housing 56 (e.g., bottom-most surface that is closest to the agricultural field 14 while the harvester 10 travels in the direction of travel 12 [FIG. 1]). In the illustrated embodiment, the debris conduit 90 extends vertically (e.g., along the vertical axis 18) downward from the surface 104. Such a configuration may facilitate removal of debris from the chamber 94 of the housing 56, as any debris within the chamber 94 may collect on the surface 104 and/or within the debris conduit 90 due to gravity. In some embodiments, at least a portion of the housing 56 may be tapered (e.g., funnel-shaped) or the surface 104 may be sloped (e.g., relative to the longitudinal axis 16), as shown by line 104', to direct debris toward the debris conduit 90.

Furthermore, in the illustrated embodiment, the debris conduit 90 is positioned proximate to the inlet 74 of the housing 56. More particularly, a first edge of the surface 104 is positioned proximate to the outlet 76 and the cooling fan 50, a second, opposite edge of the surface 104 is positioned proximate to the inlet 74 and the cleaning wand 62, and the debris conduit 90 is positioned closer to the second, opposite edge than the first edge relative to the longitudinal axis 16. During the cleaning operation, the cooling fan 50 may be reversed to blow or dislodge debris from the one or more cooling components 58, and the debris may therefore be blown or directed toward the inlet 74. Accordingly, placement of the debris conduit 90 proximate to the inlet 74 may facilitate effective and efficient removal of the debris from the housing 56.

Additionally, it should be appreciated that in some embodiments multiple suction fans 66 may be provided instead of the valve 88. For example, one suction fan 66 may be fluidly coupled to the cleaning wand 62 via the suction conduit 64, and another suction fan 66 may be fluidly coupled to the debris conduit 90. The suction fans 66 may be controlled independently to apply negative airflow to the cleaning wand 62 and/or to the debris conduit 90 at various times to carry out the techniques disclosed herein.

With reference to FIGS. 2 and 3, a controller 110 (e.g., electronic controller) having a processor 112 and a memory 114 may be utilized to control various components of the cooling system 38 to effectively and efficiently clean the cooling system 38. For example, to clear the debris from the housing 56, the controller 110 may provide a control signal (e.g., to the motor 54) that causes the cooling fan 50 to reverse a direction of rotation. At the same time (e.g., at substantially the same time, such as within a few seconds), the controller 110 may provide a control signal (e.g., to an actuator) that causes the valve 88 to move from the closed position 92 (FIG. 2) to the open position 100 (FIG. 3). In some embodiments, the controller 110 may then provide a control signal that causes rotation of the cooling fan 50 to stop for a period of time (e.g., a delay period) while the valve 88 remains in the open position 100. The period of time may a predetermined period of time greater than or equal to approximately 1, 2, 3, 4, 5, or 10 seconds, or between approximately 1 to 10 or 2 to 5 seconds. These steps may enable the cooling fan 50 to blow or dislodge debris from the one or more cooling components 58, and then enable the debris to fall or be pulled toward the surface 104 of the housing 56 as the suction fan 66 draws the debris through the debris conduit 90.

Some or all of the process may be automated. For example, the control of the valve 88 may be linked to the cooling fan 50. In such cases, upon reversal of the cooling fan 50, the controller 110 may automatically control the valve 88 to move from the closed position 92 to the open position 110. Furthermore, the controller 110 may automatically stop the reversed rotation of the cooling fan 50 after a first period of time (e.g., predetermined period of time, such as approximately 5, 10, 15, 20, 25, 30, or more seconds) and leave the cooling fan 50 off (e.g., stationary relative to the housing 56) for a second period of time (e.g., the delay period) to enable the debris to be removed from the housing 56.

The controller 110 disclosed herein is an electronic controller having electrical circuitry configured to process signals, such as signals received due to operator input at an interface, signals received from one or more sensors, or the like. The processor 112 may be any type of computer processor or microprocessor capable of executing computer-executable code or logic. The processor 14 may also include multiple processors that may perform the operations described below. Moreover, the processor 112 may include one or more microprocessors, one or more "general-purpose" microprocessors, one or more special-purpose microprocessors, and/or one or more application specific integrated circuits (ASICS), or some combination thereof. For example, the processor 112 may include one or more reduced instruction set (RISC) processors.

The memory 114 may be any suitable articles of manufacture that can serve as media to store processor-executable code, data, or the like. These articles of manufacture may represent computer-readable media (e.g., any suitable form of memory or storage) that may store the processor-executable code or logic used by the processor 112 to perform the presently disclosed techniques. The memory 114 may represent non-transitory computer-readable media (e.g., any suitable form of memory or storage) that may store the processor-executable code used by the processor 112 to perform various techniques described herein. It should be noted that non-transitory merely indicates that the media is tangible and not a signal. Moreover, the memory 114 may include a volatile memory, such as random access memory (RAM), and/or a nonvolatile memory, such as ROM.

Figure 4:
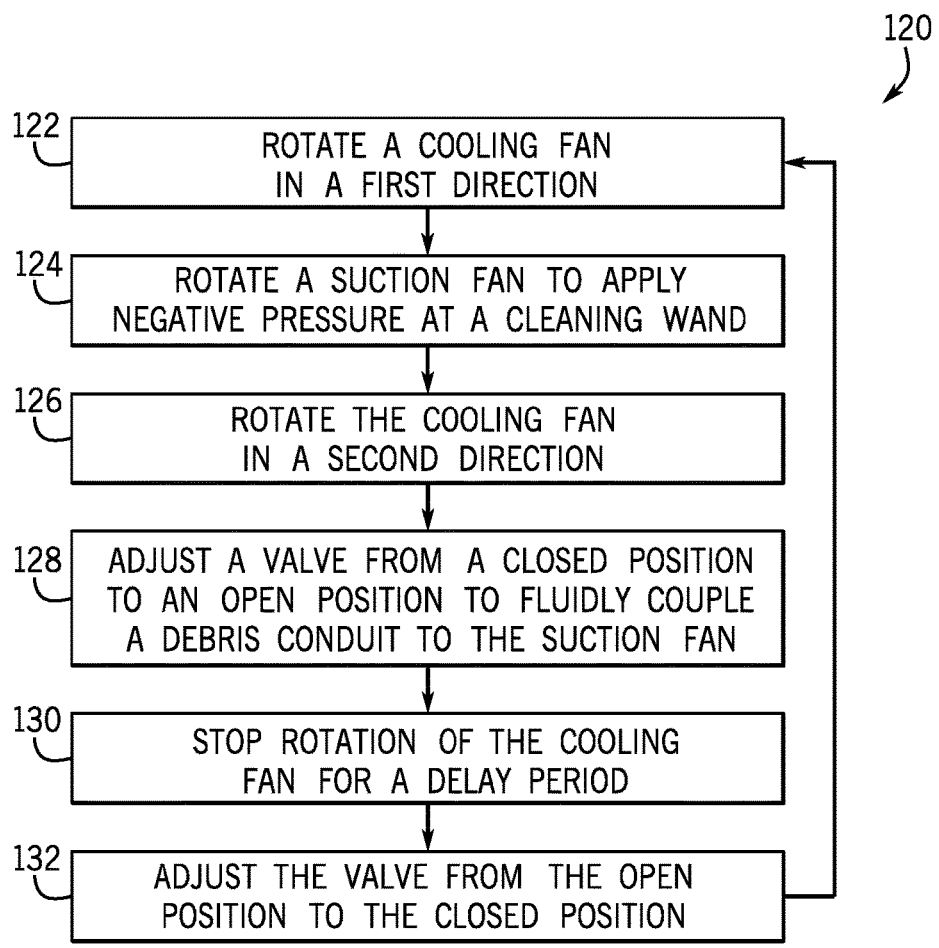
FIG. 4 is a flow diagram of a method of operating the cooling system of FIG. 2, in accordance with an embodiment of the present disclosure.

FIG. 4 is a flow diagram of an embodiment of a method 120 for operating the cooling system 38. The following description of the method 120 is described as being performed by the controller 110, but it should be noted that any suitable processor-based device may be specially programmed to perform any or all of the steps of the method 120. Furthermore, at least some of the steps of the method 120 may be performed manually (e.g., by an operator) or by different processor-based devices. Moreover, although the steps of the method 120 are described in a particular order, it should be understood that the steps of the method 120 may be performed in any suitable order, certain steps may be omitted, and other steps may be added.

In step 122, the controller 110 controls the cooling fan 50 to rotate in a first direction to draw air through the screen 60 at the inlet 74 of the housing 56. The air may facilitate cooling via the one or more cooling components 58 within the housing 56, and the air may exhaust through the outlet 76 of the housing 56 to cool or clean other components (e.g., the engine 36) of the harvester 10.

In step 124, the controller 110 controls the suction fan 66 to rotate to apply negative airflow at the cleaning wand 62, thereby facilitating cleaning of the screen 60. The valve 88 may be in the closed position 92 to enable the suction fan 66 to fluidly couple to the cleaning wand 62. Steps 122 and 124 may be carried out during normal operation of the cooling system 38.

In step 126, the cleaning operation is initiated as the controller 110 controls the cooling fan 50 to rotate in a second direction (e.g., to reverse), which causes the cooling fan 50 to blow air from the outlet 76 toward the inlet 74 of the housing 56, thereby blowing or dislodging debris from the one or more cooling components 58 within the housing 56. The controller 110 may control the cooling fan 50 to rotate in the second direction for a period of time (e.g., predetermined period of time, such as approximately 5, 10, 15, 20, 25, 30 or more seconds).

In step 128, the controller 110 controls the valve 88 to move from the closed position 92 to the open position 100 to fluidly couple the debris conduit 90 to the suction fan 66. In some embodiments, the valve 88 blocks flow between or isolates the suction fan 66 from the cleaning wand 62 while the valve 88 is in the open position 100. Step 128 may be carried out simultaneously or substantially simultaneously (e.g., within a few seconds) of step 126. Thus, the cooling fan 50 may reverse and the valve 88 may move to the open position 100 simultaneously or substantially simultaneously.

In step 130, the controller 110 controls the cooling fan 50 to stop for a period of time (e.g., the delay period). Thus, the cooling fan 50 may not rotate and may be stationary relative to the housing 56 for the period of time, which may be greater than or equal to approximately 1, 2, 3, 4, 5, or 10 seconds. In some embodiments, the period of time may be between approximately 1 to 10 or 2 to 5 seconds. Operating the suction fan 66 to withdraw debris through the debris conduit 90 while the cooling fan 50 is stationary may efficiently and effectively remove debris from the housing 56.

In step 132, the controller 110 may control the valve 88 to move from the open position 100 to the closed position 92, thereby blocking the flow of air and debris through the debris conduit 90 and fluidly coupling the suction fan 66 to the cleaning wand 62. The controller 110 may control the valve 88 to move from the open position 100 to the closed position 92 while the cooling fan 50 is stationary. Thereafter, the method 120 may return to step 122 to conclude the cleaning process and to resume normal operation of the cooling system 38.

As noted above, the steps of the method 120 may be carried out in any suitable order. Moreover, it should be appreciated that the relative times discussed above are merely exemplary and the steps of method 120 may be carried out at various times relative to one another. For example, in some embodiments, the cooling fan 50 may reverse for a period of time to blow debris from the one or more cooling components 58, the cooling fan 50 may then stop for a period of time to allow the debris to settle at the surface 104 of the housing 56, and the valve 88 may then move from the closed position 92 to the open position 100. Thus, the valve 88 may move to the open position 100 while the cooling fan 50 is stationary, rather than at substantially the same time that the cooling fan 50 reverses directions.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A cooling system for an agricultural vehicle, comprising:
    a housing configured to support one or more cooling components;
    a screen positioned at an inlet of the housing;
    a cleaning wand configured to remove debris from the screen;
    a suction conduit extending from the cleaning wand;
    a debris conduit extending from the housing of the cooling system;
    a suction fan configured to rotate to apply negative airflow; and
    a valve configured to move between an open position in which the suction conduit is isolated from the suction fan and the debris conduit is fluidly coupled to the suction fan and a closed position in which the debris conduit is isolated from the suction fan and the suction conduit is fluidly coupled to the suction fan.

2. The cooling system of claim 1, wherein the debris conduit extends from a bottom-most surface of the housing.

3. The cooling system of claim 2, wherein the bottom-most surface of the housing is sloped to direct debris into the debris conduit.

4. The cooling system of claim 1, comprising a cooling fan configured to rotate in a first direction to draw air from the inlet to an outlet of the housing and to rotate in a second direction to push air from the outlet to the inlet of the housing, wherein the cooling fan is positioned proximate to the outlet on one side of the housing and the debris conduit is positioned proximate to the inlet on an opposite side of the housing.

5. The cooling system of claim 1, wherein the valve comprises a flapper valve comprising a plate and a hinge.

6. The cooling system of claim 1, wherein the one or more cooling components are configured to cool a fluid for an engine of the agricultural vehicle, a hydraulic fluid for a hydraulic power circuit of the agricultural vehicle, a refrigerant used in an air conditioning circuit of the agricultural vehicle, or a combination thereof.

7. The cooling system of claim 1, wherein the agricultural vehicle is a harvester.

8. The cooling system of claim 1, comprising:
    a cooling fan configured to rotate in a first direction to draw air from the inlet to an outlet of the housing and to rotate in a second direction to push air from the outlet to the inlet of the housing; and
    a controller configured to generate control signals to coordinate rotation of the cooling fan and movement of the valve between the open position and the closed position.

9. A cooling system for an agricultural vehicle, comprising:
    a housing configured to support one or more cooling components;
    a cooling fan positioned proximate to the housing;
    a debris conduit extending from the housing;
    a valve configured to move between an open position in which the debris conduit is fluidly coupled to a suction fan and a closed position in which the debris conduit is isolated from the suction fan; and
    an electronic controller configured to generate control signals to coordinate rotation of the cooling fan and movement of the valve, wherein the control signals cause the cooling fan to reverse rotation from a first direction in which the cooling fan draws air from an inlet to an outlet of the housing to a second direction in which the cooling fan pushes air from the outlet to the inlet of the housing, and the control signals cause the valve to move from the closed position to the open position at substantially the same time.

10. The cooling system of claim 9, wherein the debris conduit extends from a bottom-most surface of the housing.

11. The cooling system of claim 9, comprising a cleaning wand configured to remove debris from a screen of the housing, wherein the cleaning wand is fluidly coupled to the suction fan while the valve is in the closed position and is fluidly isolated from the suction fan while the valve is in the open position.

12. The cooling system of claim 9, wherein the control signals cause the cooling fan to be stationary relative to the housing for a delay period while the valve is in the open position and while the suction fan operates to draw debris from the housing through the debris conduit.

13. A method of operating a cooling system for an agricultural vehicle, comprising:
   rotating a cooling fan to draw air from an inlet to an outlet of a housing of the cooling system;
   operating a suction fan to apply a negative airflow;
   removing debris from a screen at the inlet of the housing with the negative airflow through a suction conduit;
   reversing rotation of the cooling fan to push air from the outlet to the inlet of the housing; and
   adjusting a valve from a closed position to an open position, thereby blocking the negative airflow through the suction conduit and enabling the negative airflow through a debris conduit extending from the housing to facilitate removal of debris from the housing.

14. The method of claim 13, comprising stopping rotation of the cooling fan for a delay period while the valve is in the open position and while the suction fan operates to draw debris from the housing through the debris conduit.

15. The method of claim 14, wherein the delay period comprises at least 2 seconds.

16. The method of claim 14, comprising adjusting the valve from the open position to the closed position during the delay period, and subsequently rotating the cooling fan to draw air from the inlet to the outlet of the housing.

17. The method of claim 13, wherein removing debris from the screen comprises operating a cleaning wand that is fluidly coupled to the suction conduit and the suction fan while the valve is in the closed position.

18. The method of claim 17, wherein the valve isolates the cleaning wand from the suction fan in the open position.

19. The method of claim 13, wherein reversing rotation of the cooling fan and adjusting the valve from the closed position to the open position occur substantially simultaneously.

20. The method of claim 13, wherein the valve isolates the suction conduit from the suction fan in the open position.

* * * * *